United States Patent
Joynson et al.

(10) Patent No.: US 7,264,655 B2
(45) Date of Patent: Sep. 4, 2007

(54) GAS/LIQUID SEPARATION IN WATER INJECTION INTO HYDROCARBON RESERVOIR

(75) Inventors: Jeremy Duncan Stuart Joynson, Des Papalins (MC); Dirk Johan van der Zee, Crovetto Frères (MC)

(73) Assignee: Single Buoy Moorings, Inc., Houston, TX (US)

( * ) Notice: Subject to any disclaimer, the term of this patent is extended or adjusted under 35 U.S.C. 154(b) by 307 days.

(21) Appl. No.: 10/991,019

(22) Filed: Nov. 17, 2004

(65) Prior Publication Data

US 2005/0120879 A1    Jun. 9, 2005

Related U.S. Application Data

(60) Provisional application No. 60/526,677, filed on Dec. 3, 2003.

(51) Int. Cl.
*B01D 19/00*    (2006.01)

(52) U.S. Cl. ............................ 95/246; 95/248; 95/261; 96/195; 96/208; 96/216

(58) Field of Classification Search .................. 95/261, 95/246, 248; 96/195, 208, 216, 196, 214, 96/217, 202
See application file for complete search history.

(56) References Cited

U.S. PATENT DOCUMENTS

| | | | |
|---|---|---|---|
| 4,199,332 A * | 4/1980 | Krohn et al. ................. | 96/208 |
| 5,000,766 A | 3/1991 | Yano et al. | |
| 6,478,962 B1 * | 11/2002 | Brockhoff et al. ....... | 210/512.1 |
| 6,752,860 B1 * | 6/2004 | Hoydal et al. ................. | 96/157 |

FOREIGN PATENT DOCUMENTS

| | | |
|---|---|---|
| EP | 0 089 128 | 9/1983 |
| FR | 962 402 | 6/1950 |
| GB | 209439 | 1/1924 |
| GB | 1531537 | 11/1978 |
| GB | 2008971 | 6/1979 |
| WO | WO 03/031337 | 6/2000 |

* cited by examiner

*Primary Examiner*—Duane Smith
*Assistant Examiner*—Douglas J. Theisen
(74) *Attorney, Agent, or Firm*—Leon D. Rosen

(57) ABSTRACT

A water stream is treated to remove oxygen before injecting the water into an underground hydrocarbon reservoir. The water-oxygen mixture is separated by centrifugal action using fixed spin blades (20). Oxygen is removed from the center of the conduit through a gas pipe (30) coupled to a vacuum pump (50). Nitrogen may be introduced upstream of the centrifuge to dilute the water-gas solution to improve the efficiency of the gas-liquid separation.

7 Claims, 2 Drawing Sheets

GAS/LIQUID SEPARATION IN WATER INJECTION INTO HYDROCARBON RESERVOIR

CROSS-REFERENCE

Applicant claims priority from U.S. Provisional Application Ser. No. 60/526,677 filed 3 Dec. 2003.

BACKGROUND OF THE INVENTION

When hydrocarbons are produced from underground hydrocarbon reservoirs (which may also lie under a sea), the pressure and production rate tends to fall unless a fluid such as water is injected into the reservoir. Sea water is probably the most common injected fluid used in the production of hydrocarbons from undersea reservoirs, although water produced along with hydrocarbons from a reservoir may be reinjected. Sea water generally has about 10 ppm (parts per million) of dissolved oxygen. Once the water is pumped to high pressurize for reservoir injection, oxygen in the water can cause rapid corrosion of many of the steels commonly used in the construction of the system. The oxygen also feeds undesirable biological activity in the reservoir. As a result, it is common to reduce the amount of oxygen before it is pressurized and injected.

One way to remove the oxygen is to reduce the pressure of the water so that dissolved gases break out of solution, and to then separate these two phases under normal gravity separation in a vertical tower filled with packing. This equipment is comparatively large. An apparatus and method that reduces the overall size and weight of the necessary equipment would be of value for the offshore oil industry where provisions for space and weight have a significant cost.

SUMMARY OF THE INVENTION

In accordance with one embodiment of the present invention, applicant provides an apparatus and method for separating gas from liquid, and for reducing oxygen in water that is to be injected into a hydrocarbon reservoir. A fluid stream which is a combination of water and dissolved gases, passes into a main conduit where its pressure is reduced to cause dissolved gases to break out of solution. The resulting mixture of water and gases is centrifuged to move gas to the center of the conduit and water to the periphery. A gas pipe inlet portion lies at the center of the water conduit at a location closely downstream of the centrifuge, to remove gases from the fluid and pass them through the gas pipe and a vacuum pump to the atmosphere.

The amount of oxygen in the water to be injected may be further reduced by injecting nitrogen into the fluid stream before the centrifuge separation, to cause nitrogen to be dissolved in the water and displace some of the other gases that include oxygen. When the water pressure is reduced, more gas breaks out of solution and the oxygen content is further reduced.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
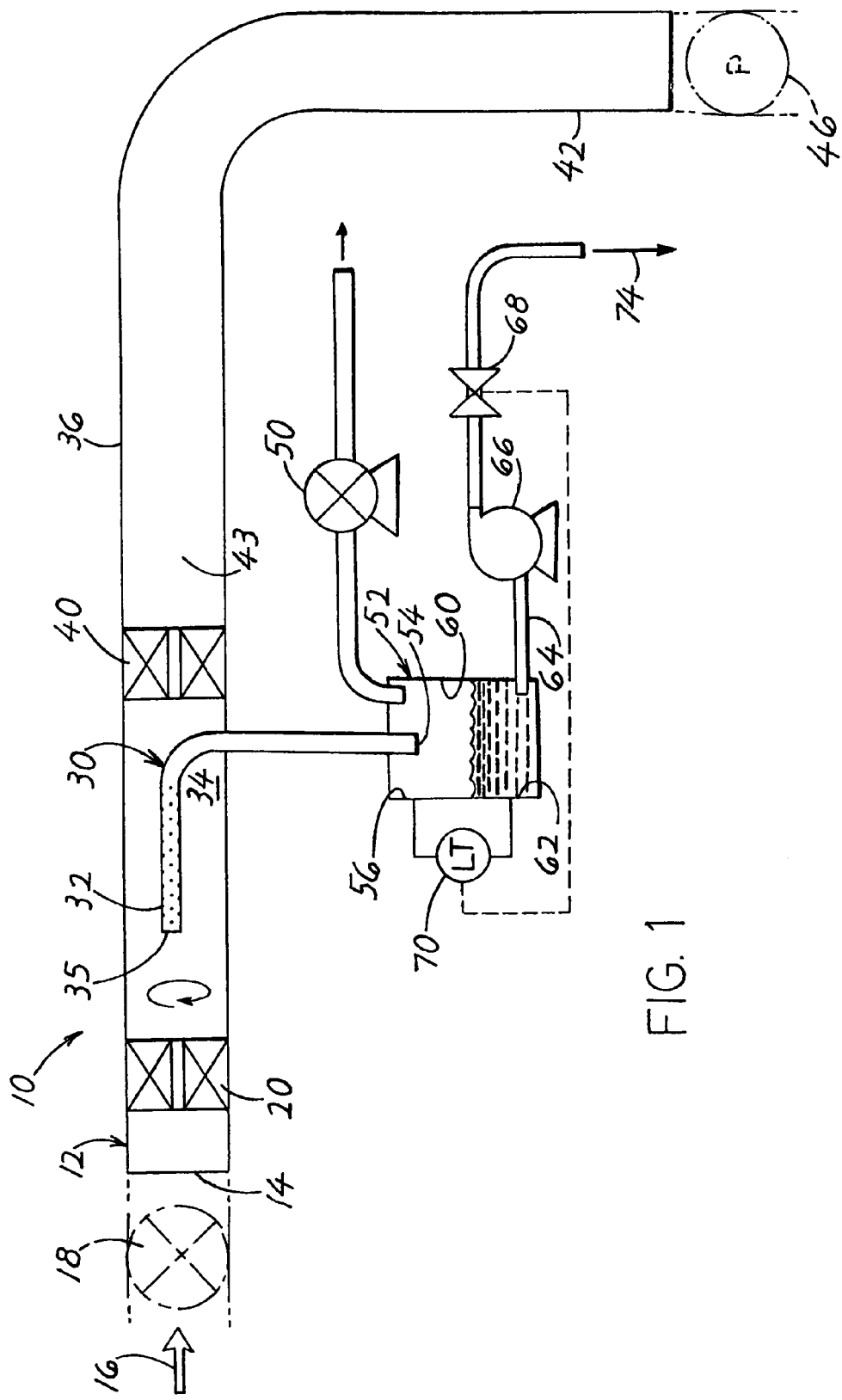
FIG. 1 is a simplified view of a gas/water separation system of one embodiment of the present invention.

FIG. 1 illustrates a system 10 with a main conduit, or water conduit, 12 with an inlet 14 that receives fluid 16 that is water that may have been filtered and that has dissolved gases. In the example to be described, the water is sea water (water with dissolved salts) with dissolved gases that consist primarily of air (21% oxygen, 78% nitrogen, 1% argon and trace amounts of other gases). It is the oxygen, which corrodes steels used in the construction of the water injection system, and which results in undesirable biological activity in a hydrocarbon reservoir, that is to be removed from the sea water. Where the fluid consists primarily of water, it sometimes will be referred to herein simply as "water."

The system of FIG. 1 applies a vacuum to water at the entrance 14. This can be accomplished by a valve 18 upstream of the conduit. The restriction in flow caused by the valve is adjustable to regulate water pressure downstream of the valve. The reduced water pressure results in gases in the water coming out of solution and forming gas bubbles. The system of FIG. 1 includes a centrifuge device 20 formed by fixed blades that direct the incoming gas-liquid mixture to rotate while continuing to flow. Immediately downstream of the centrifuge device, the spinning fluid separates into gas at the center of the conduit and liquid at the outer or peripheral portion of the conduit. A gas removal pipe 30 has a gas pipe inlet portion 32 lying downstream of the centrifuge to remove gas from the mixture. The gas pipe inlet portion 32 is spaced slightly downstream from the centrifuge blades to allow the spinning fluid to separate. The remaining portion of the fluid mixture 34, which has been treated so most of the gas has been removed, passes downstream along the conduit portion 36.

In many cases the treated fluid, or water 34 passes through an exit blade device 40 that removes the spin. According to the law of conservation of energy, the removal of spin recovers some pressure, so that a higher vacuum lies upstream of the device 40. The water that has been treated to deoxygenate it, usually passes through a downstream pump 46 that injects it into an undersea hydrocarbon reservoir to maintain the pressure therein. Such pump is positioned below the conduit so the vertical water column in a downward portion 42 of the conduit provides a head or pressure at the pump to meet the required minimum suction conditions of the pump. This vertical height is typically 4 to 8 meters and depends on the pump design.

In accordance with one aspect of the present invention, applicant applies a gas-drawing mechanism such as a vacuum pump 50 to the gas pipe 30. The gas pipe could be provided with a simple hole at its upstream end 35 to take out gas. However, applicant prefers to use a perforated gas inlet portion 32 that withdraws gas along a distance in the water pipe that is greater than the diameter at the upstream gas pipe end. Although the diameter of the gas-containing region at the center of the water pipe may be larger than the diameter of the gas inlet 32, all of the gas in the gas-containing region can readily flow into the gas pipe because of the vacuum being applied and the perforations in the side of the gas pipe inlet portion. It is possible to vary the level of the vacuum (the pressure below atmospheric, or below the pressure in the water pipe at a location upstream from the gas pipe inlet) applied by the vacuum pump 50 to remove a high proportion of the gas that is present while removing a minimum of the liquid.

Some of the fluid drawn into the gas pipe inlet includes water droplets. The water should be removed before the fluid reaches the vacuum pump 50. FIG. 1 shows a separator 52 located along the gas pipe 30. The separator includes a chamber 60 that receives the fluid that has passed into the gas pipe. The fluid which is primarily gas, is preferably routed downward through gas pipe end 54 to chamber 60 so that the vacuum in the conduit is improved by an amount equal to the static head of fluid in the pipe 30. The gas and liquid separate under gravity in the chamber 60. Gas in the chamber is removed from the upper portion 56 of the chamber to avoid a pressure buildup in the chamber. FIG. 1 shows a water pipe 64, pump 66 and a valve 68 through which the liquid is removed. A level transmitter 70 senses when the level of the liquid 62 drops below a certain level, and this signal is fed into a controller to maintain a fixed liquid level. The controller may regulate the water pump speed or regulate the opening of valve 68 in the water outlet line, so gas is not removed through the liquid removal pipe. The removed water passes along a path 74 that can lead to an atmospheric disposal location which may be a drain system or the open sea, or that can be otherwise handled.

Figure 2:
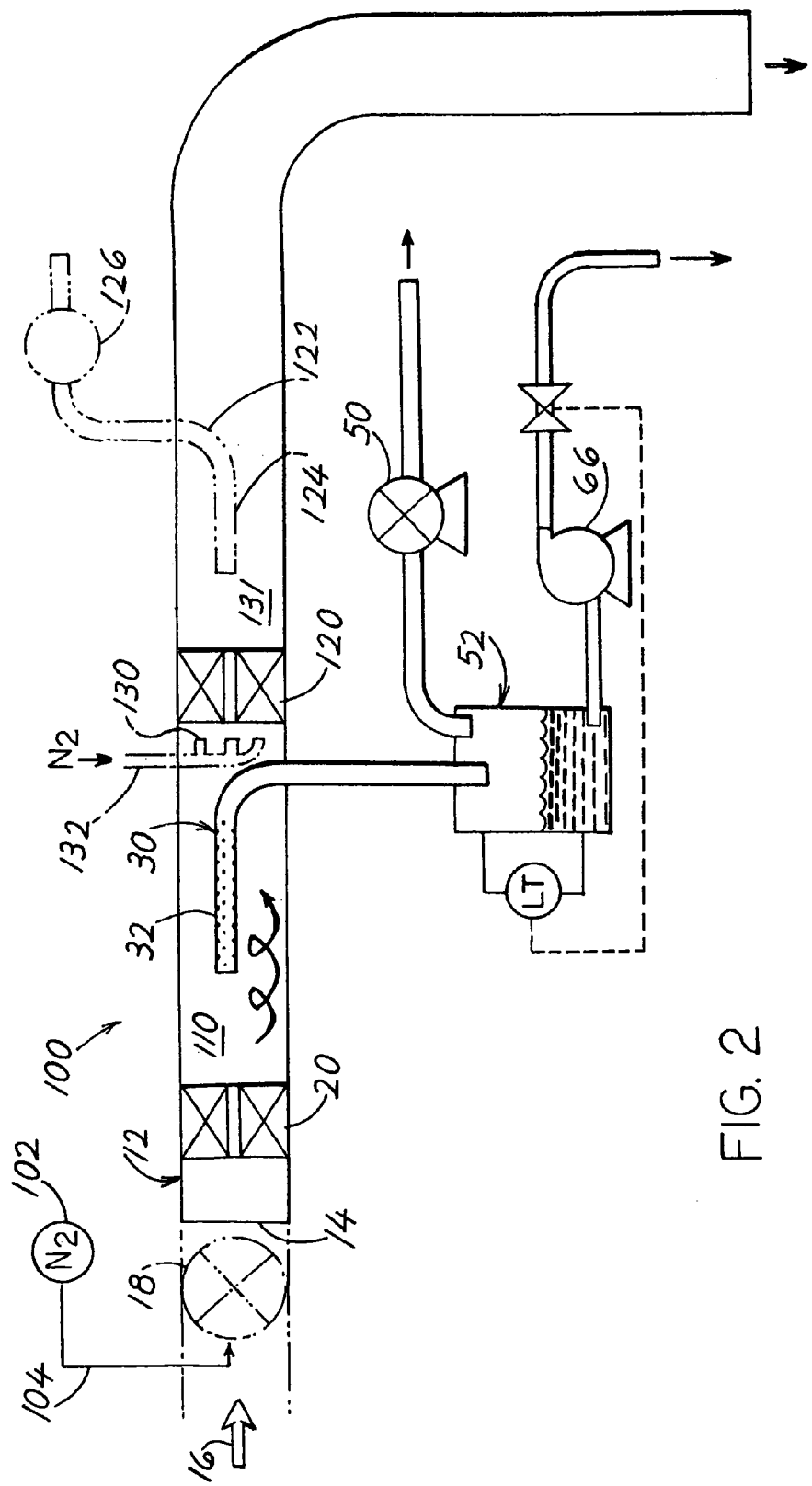
FIG. 2 is a simplified view of a gas/water separation system of another embodiment of the invention.

Sea water commonly contains 50 ppm (parts per million) of air which includes 10 ppm of oxygen. The water may be close to saturation with dissolved gases, so a reduction in pressure can lead to gas being released and forming gas bubbles. Atmospheric air consists of 21% oxygen, 78% nitrogen, 1% argon and trace amounts of other gases. Nitrogen normally does not react with hydrocarbons or steel and argon is inert, so they do not affect a reservoir of hydrocarbons. Thus, the reduction in the oxygen content of fluid injected into the reservoir is the major goal of the system. FIG. 2 illustrates a system 100 of the invention that further reduces the amount of oxygen in the injected fluid.

In the system of FIG. 2, nitrogen gas is injected from a source 102 into the water-gas fluid that lies in or that enters the water conduit. The nitrogen gas is mixed into the water and air mixture 16 and some of the nitrogen is dissolved in the water. The nitrogen dissolved in the water saturates the water with gas, and causes more of the gas to come out of solution when the water pressure is reduced. Some of the additional gas that comes out of the solution with water is additional oxygen. After gas bubbles are removed by the gas pipe inlet 32, the fluid mixture 112 in the water conduit 12 now contains gas with a smaller amount of oxygen per cubic meter, although with the same or even a greater overall amount of gas in the water, and passes along a conduit portion 114. Nitrogen can be obtained by liquefaction of air at moderate cost, and typically produces gas with 98% nitrogen. Other means of supplying nitrogen include pressurized bottles shipped to the site, and the reverse osmosis process.

Instead of injecting the nitrogen into the fluid initially entering the water pipe, it is possible to inject nitrogen into the fluid after much of the air has been removed. In FIG. 2 applicant indicates in phantom lines that instead of a spinner he may use a second centrifuge 120 and a second gas pipe 122 with a second gas pipe inlet portion 124 connected to a second pump 126. The second centrifuge is a barrier to water flow, and results in a vacuum in and downstream of the second centrifuge. Nitrogen may be injected only at location 130 which lies downstream of the first gas pipe inlet 32, as by an injection pipe 132. At the nitrogen injection location 130, a considerable percent of the air has already been removed, so a high percent of the injected nitrogen will become dissolved in water and as a result of the two stages a higher percent of oxygen will be removed from the water. However, this requires establishing a vacuum at two locations (110 and 130).

Thus, the invention provides a system and method for the separation of gas from a gas/liquid mixture, and which is especially useful in the removal of oxygen from water that is to be injected into a hydrocarbon reservoir. Water with air in it is flowed though a water conduit, through a conduit region of reduced water pressure so gas comes out of solution, and is rotated in the conduit region to cause air bubbles to move to the middle of the conduit from which they are removed. The mechanical separation efficiency of the gas withdrawal may be adjusted by varying the gas volume fraction to an optimum value depending on system operating pressure and specific geometry. The efficiency of gas withdrawal is increased by injecting nitrogen into the water conduit and mixing the nitrogen with the air before the water is centrifuged. The nitrogen increases the gas content of the water so more gas comes out of solution where the water pressure is reduced. It also is possible to first remove much of the air, then inject nitrogen to increase the amount of dissolved gas in the water, and then remove the gas again. To remove much of the remaining oxygen in water at location 42, an oxygen scavenger chemical an be injected in the water at 43. Such chemical can reduce the oxygen contact to zero by chemically reacting with the oxygen in a manner similar to that in a conventional tower deoxygenation system.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for treating a water-gas combination wherein the gas includes oxygen and is dissolved in the water, to obtain water with a minimum percent of the oxygen, comprising:

maintaining a vacuum in a first conduit at a centrifuge that lies in the first conduit, and passing the combination through the centrifuge while the centrifuge spins the combination to urge the gas towards the center of the conduit and to urge the liquid toward the periphery of the conduit, and passing fluid that includes gas, from the center of the first conduit at a location downstream of the centrifuge, into a gas pipe inlet portion.

2. The method described in claim 1 including:

maintaining a gas pressure that is less than atmospheric in said gas pipe at a location immediately downstream of said gas pipe inlet portion.

3. The method described in claim 1 wherein:

said step of removing gas includes removing gas along a length of the first conduit that is at least equal to the diameter of said gas inlet portion.

4. A method for treating water that contains dissolved air before injecting the water into an underground hydrocarbon reservoir from which hydrocarbons are being produced to minimize oxygen in the injected water, which includes performing at least one removal attempt to remove air from the water, by lowering the pressure of the water in a reduced pressure region of a conduit so dissolved gas is released, which is then removed, comprising:

rapidly spinning water in the conduit in said reduced pressure region while continually passing the water downstream along the conduit and removing some of the gas from a center of said conduit, and later again spinning the water from which some of the gas has been removed and removing for a second time, some of the gas from a center of the conduit;

injecting nitrogen into the water at a location downstream of where some of the gas has already been removed and upstream of the location where gas is removed for a second time.

5. Apparatus for use in hydrocarbon production that includes a first conduit having a first inlet that receives a flow of a water-gas solution wherein the gas includes oxygen, for separating much of the oxygen from the water, comprising:

a centrifuge lying in the first conduit that spins the water-gas solution to urge the gas toward the center of the first conduit and urge the water toward the periphery of the first conduit;

a gas pipe with a gas inlet portion that lies at the center of the first conduit and downstream of the centrifuge and that receives fluid that includes gas that lies at the center of the first conduit;

means for establishing a water pressure less than atmospheric at said centrifuge to cause some of the gas in the water-gas solution to come out of solution and move to the center of the first conduit for removal through said gas inlet portion;

a vacuum pump connected to said gas pipe to increase the withdrawal of gas from said first conduit: and a separator lying along said gas pipe upstream of said vacuum pump, that removes water from fluid in said gas pipe.

6. Apparatus for use in hydrocarbon production that includes a first conduit having a first inlet that receives a flow of a water-gas solution wherein the gas includes oxygen, for separating much of the oxygen from the water, comprising:

a centrifuge lying in the first conduit that spins the water-gas solution to urge the gas toward the center of the first conduit and urge the water toward the periphery of the first conduit;

a gas pipe with a gas inlet portion that lies at the center of the first conduit and downstream of the centrifuge and that receives fluid that includes gas that lies at the center of the first conduit;

means for establishing a water pressure less than atmospheric at said centrifuge to cause some of the gas in the water-gas solution to come out of solution and move to the center of the first conduit for removal through said gas inlet portion;

a second centrifuge device lying in said first conduit downstream of said gas inlet portion;

a source of nitrogen;

a nitrogen-carrying pipe that extends from said source to a location in said conduit that is between said gas inlet portion and said second centrifuge device and which injects nitrogen at said location;

a second gas pipe element with a second gas pipe element inlet portion lying closely downstream of said second centrifuge device;

said means for establishing also establishes a pressure less than atmospheric at said second centrifuge device.

7. Apparatus for use in hydrocarbon production that includes a first conduit having a first inlet that receives a flow of a water-gas solution wherein the gas includes oxygen, for separating much of the oxygen from the water, comprising:

a centrifuge lying in the first conduit that spins the water-gas solution to urge the gas toward the center of the first conduit and urge the water toward the periphery of the first conduit;

a gas pipe with a gas inlet portion that lies at the center of the first conduit and downstream of the centrifuge and that receives fluid that includes gas that lies at the center of the first conduit;

a vacuum pump coupled to said gas pipe to increase the withdrawal of gas from said first conduit.

* * * * *